United States Patent [19]

Kojima et al.

[11] Patent Number: 4,785,400

[45] Date of Patent: Nov. 15, 1988

[54] METHOD FOR PROCESSING A DATA BASE

[75] Inventors: Keiji Kojima, Kodaira; Shunichi Torii, Musashino, both of Japan

[73] Assignee: Hitachi, Ltd., Tokyo, Japan

[21] Appl. No.: 15,694

[22] Filed: Feb. 17, 1987

Related U.S. Application Data

[62] Division of Ser. No. 684,789, Dec. 21, 1984, Pat. No. 4,644,471.

[30] Foreign Application Priority Data

Dec. 23, 1983 [JP] Japan ............................. 58-242024

[51] Int. Cl.⁴ .................................................. G06F 1/00
[52] U.S. Cl. ..................................................... 364/300
[58] Field of Search ... 364/200 MS File, 900 MS File, 364/300

[56] References Cited

U.S. PATENT DOCUMENTS 4,631,664 12/1986 Bachman .......................... 364/200

Primary Examiner—Raulfe B. Zache
Attorney, Agent, or Firm—Antonelli, Terry & Wands

[57] ABSTRACT

The data elements for a column of a table are fetched from irregular address locations in memory and stored as vector data with a regular address increment. Vector designating data is also generated which includes at least the first element address of the stored vector data and the increment of the vector. The vector data is processed by a program routine which can perform the processing required by a selected command and which includes vector instructions each designating at least one set of vector data elements to be executed, in such a manner that vector data elements are fetched successively from the data storage device and are supplied successively to a pipelined arithmetic or logical operation unit.

12 Claims, 16 Drawing Sheets

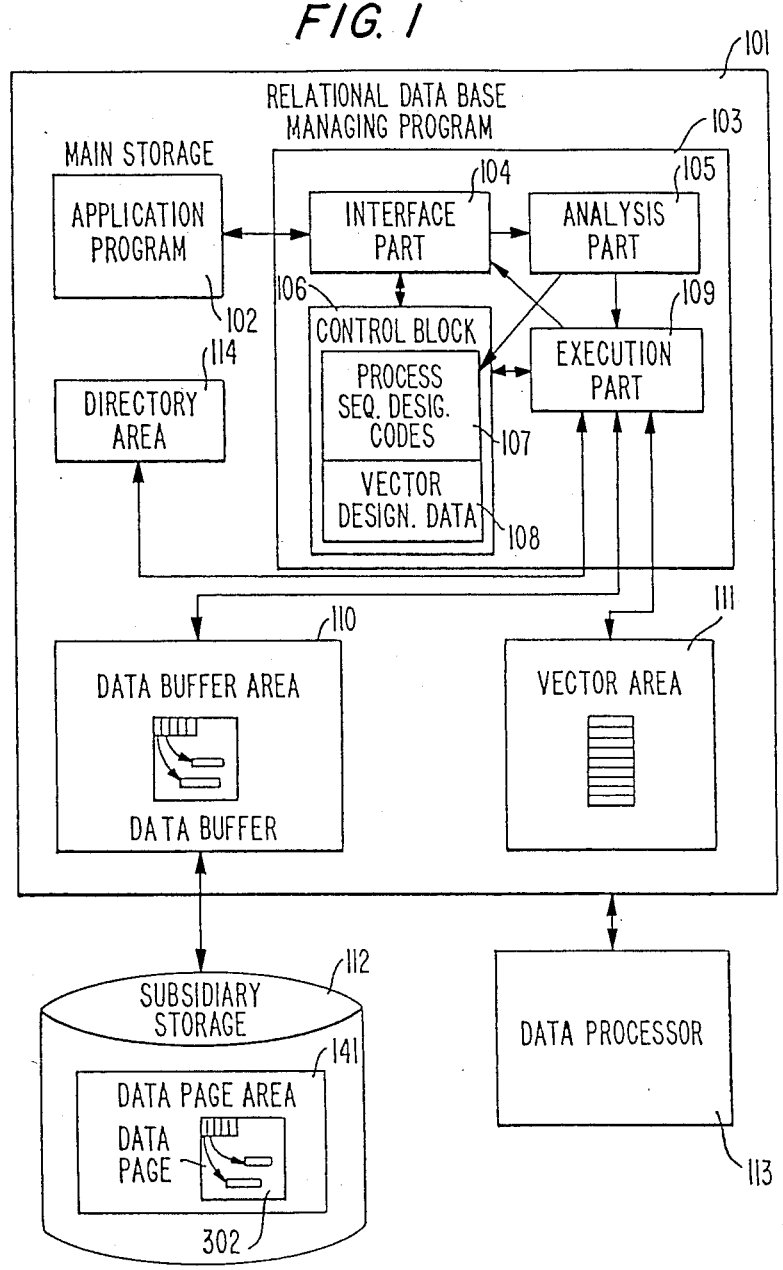

FIG. 2A
COMMODITY TABLE

| COMMODITY | SALESMAN |
|---|---|
| X3 | E |
| X2 | B |
| X1 | G |
| X4 | C |

201

FIG. 2B
TELEPHONE NUMBER TABLE

| EMPLOYEE | EXT |
|---|---|
| A | 316 |
| D | 223 |
| E | 331 |
| G | 141 |
| C | 314 |
| B | 264 |
| F | 173 |
| H | 412 |

202

FIG. 2C
SEARCH COMMAND

204

| SELECT COMMODITY; CLERK; EXT | —205 |
| FROM COMMODITY TABLE; TELEPHONE NO. TABLE | —206 |
| WHERE SALES CLERK = EMPLOYEE | —207 |

FIG. 2D
SEARCH RESULT

203

| COMMODITY | SALESMAN | EXT |
|---|---|---|
| X3 | E | 331 |
| X2 | B | 264 |
| X1 | G | 141 |
| X4 | C | 314 |

FIG. 6
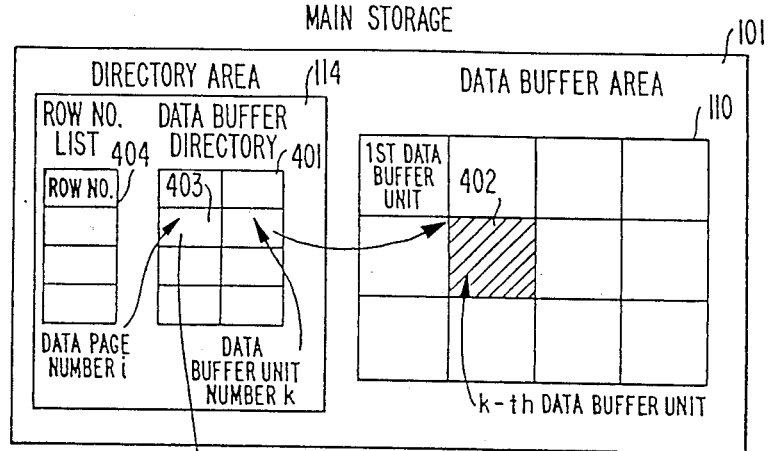
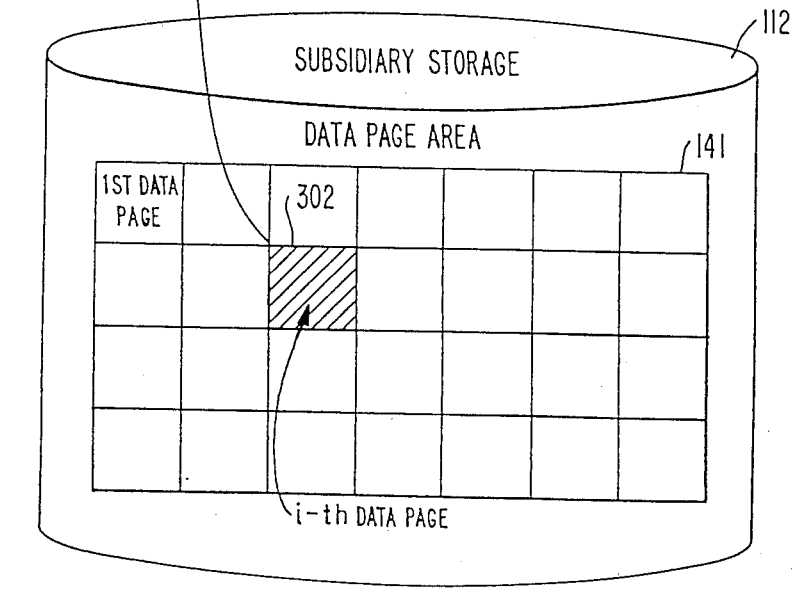

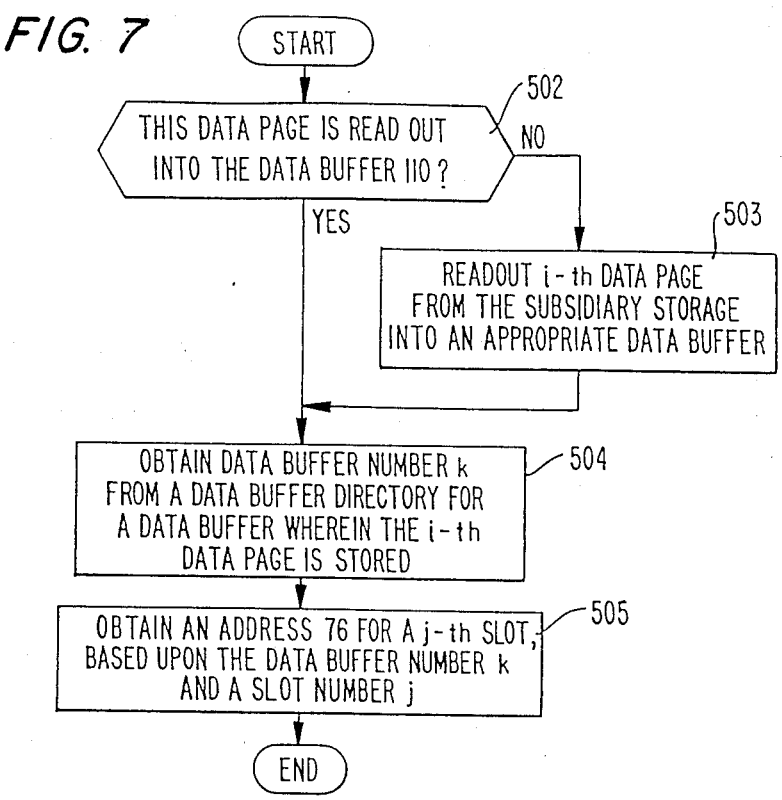
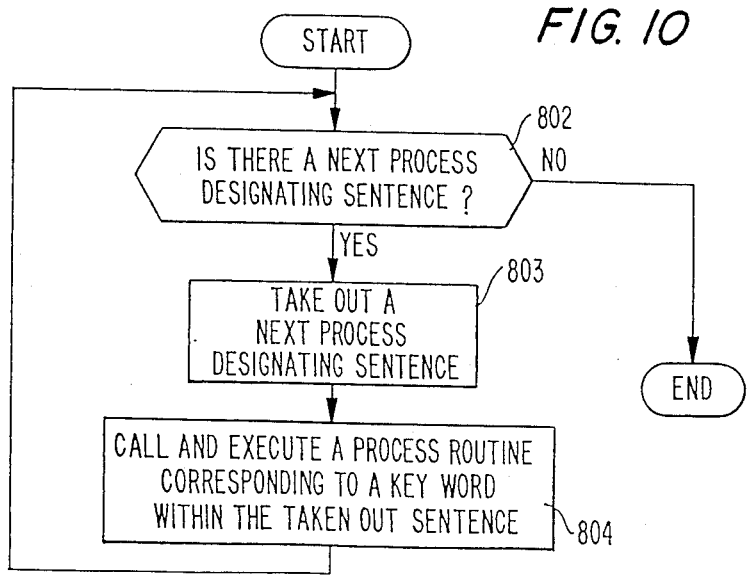

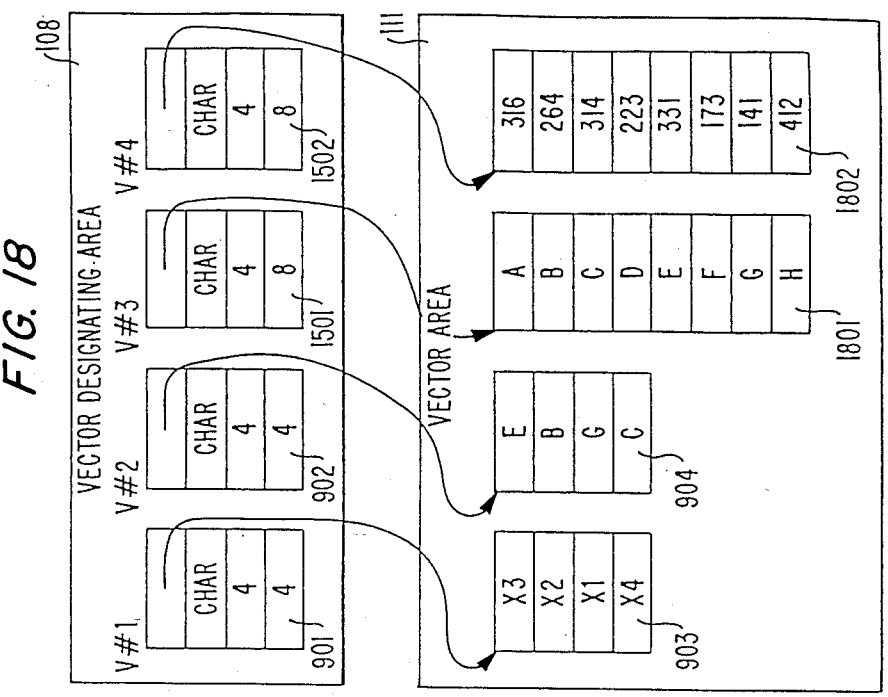
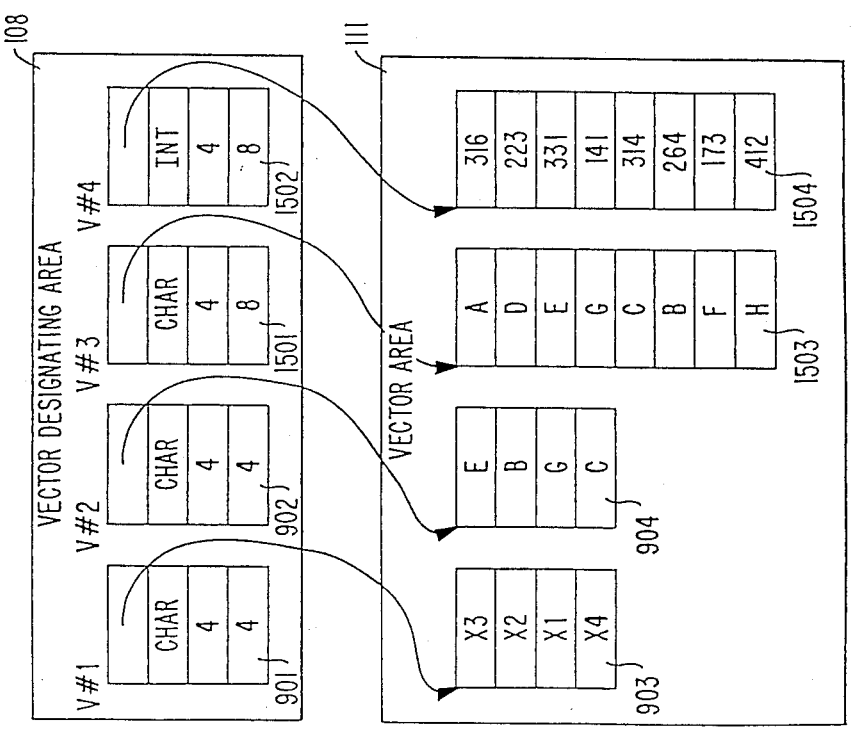

METHOD FOR PROCESSING A DATA BASE

This is a division of application Ser. No. 684,789, filed Dec. 21, 1984 now U.S. Pat. No. 4,644,471.

BACKGROUND OF THE INVENTION

The present invention relates to a method for processing a data base, especially a relational data base.

In a relational data base, data is managed conceptually in the form of tables. If we arrange the physical storage into the style of a table, however, operations such as insertion or deletion of data become more difficult. Therefore, according to the prior art, as shown by a publication entitled "An Introduction to Database System" written by C. J. Date, pp. 171–179, data elements are dividedly stored within unit areas, each called a page, so that each page includes plural data elements, and in each page there are included pointers which point to a location of a data element. This style of storage of data is suited for insertion or deletion of data elements, but is does not suit fast processing by means of hardware, such as a vector data processor, which processes a large amount of data as a group by a pipeline method. That is, it is necessary in general to provide a large number of data elements to be processed to an arithmetic or logic operation unit (ALU) with as small a time pitch as possible, but it is difficult to do so for data stored with the aforementioned page style. The reasons are as follows.

In a pipelined processor, data elements are fetched in advance of execution of an operation on the data elements by successively generating the addresses of the data elements to be fetched within a data storage, in advance of the execution of the operation, so that data elements are successively supplied to an ALU with a small time pitch. For example, in a vector data processor, vector data elements to be processed are stored at storage locations each with a predetermined address difference from its neighboring location. Therefore, it is possible to successively decode addresses of all vector elements with a small time pitch, based upon only the address of the first vector element and the address difference or displacement between elements. According to the prior art relating to page type data, data elements are not spaced with a constant address difference. Therefore, it is difficult to successively generate the addresses of all vector elements with a small time pitch. Therefore, it is difficult to successively provide data elements to a pipelined ALU with a short time period.

SUMMARY OF THE INVENTION

Therefore, it is an object of the present invention to provide a method for performing a piplelined processing on a data base which includes data elements spaced at irregular address increments.

Accordingly, to the present invention, the data elements for a column or table are fetched from irregular address locations in memory and stored as vector data with a regular address increment. Vector designating data is also generated which includes at least the first element address of the stored vector data and the increment of the vector. The vector data is processed by a program routine which can perform the processing required by a selected command, and which includes vector instructions each designating at least one set of vector data elements to be executed, in such a manner that vector data elements are fetched successively from the data storage device and are supplied successively to a pipelined arithmetic or logical operation unit.

BRIEF DESCRIPTION OF THE DRAWINGS

FIG. 1 is a schematic diagram of a data base managing system;

FIG. 2 is a diagram of a table provided in the system of FIG. 1;

FIG. 2B is a diagram of another table provided in the system of FIG. 1;

FIG. 2C is a diagram of a search command as used in the system of FIG. 1;

FIG. 2D is a diagram of a table obtained as a result of execution of the search command in FIG. 2C;

FIG. 6 is a diagram which shows how data is stored in the main storage and the subsidiary storage of a system in FIG. 1;

FIG. 7 is a flow chart of steps for obtaining table row addresses in a memory based upon row numbers;

FIG. 10 is a flow chart of a CONTROL routine (701) of FIG. 9;

FIG. 17 is a diagram of vectors obtained as a final result of execution of the BUILD-VECTOR routine (107) of FIG. 9;

FIG. 18 is a diagram of vectors obtained after execution of a SORT-VECTOR routine (705) of FIG. 9;

Figure 3:
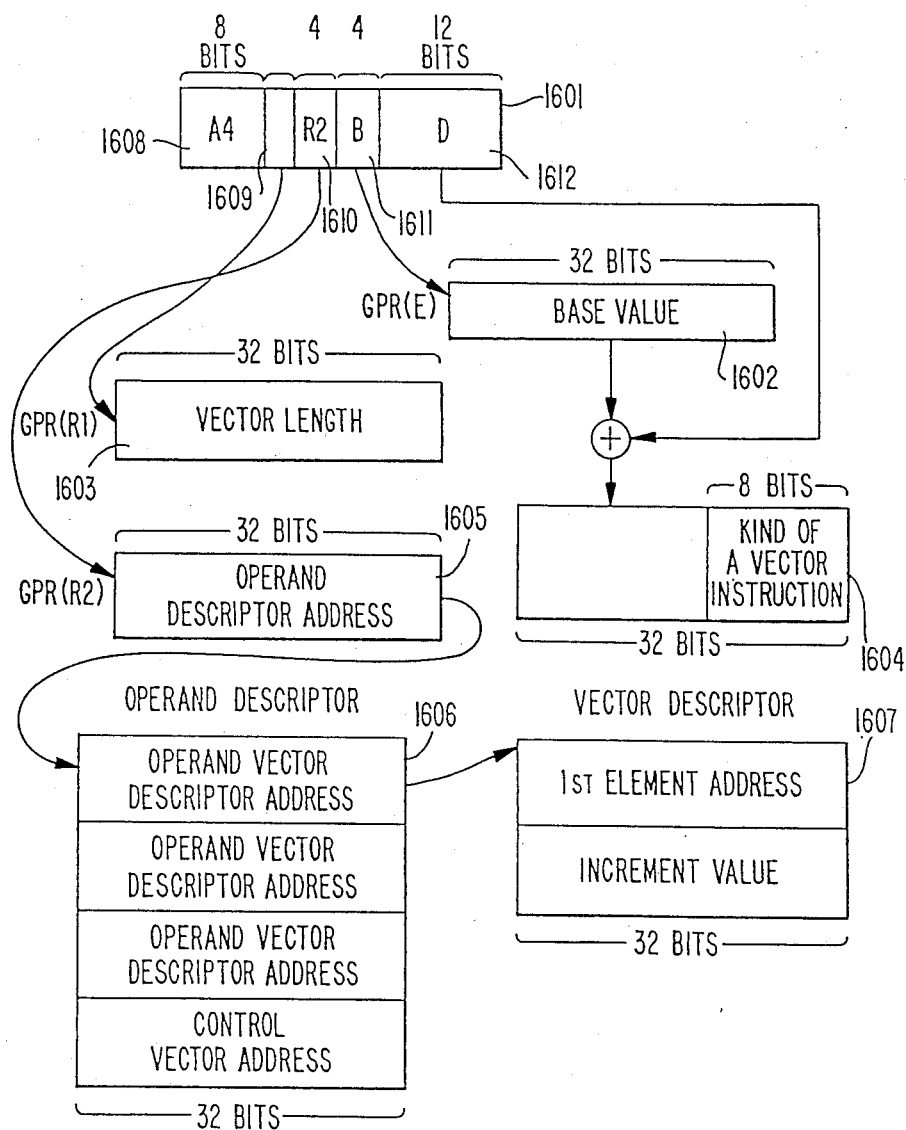
FIG. 3 is a diagram of a vector instruction format used in the embodiment in FIG. 1.

DETAILED EXPLANATION OF A PREFERRED EMBODIMENT (Outline of an operaton of the system)

FIG. 1 shows a shematic diagram of a relational data base managing system according to the present invention. In a main storage 101, a search command is issued from an application program 102 and is examined by an interface part 104 of a relational data base managing program 103, which identifies the command as a search command. An analysis part 105 of the program 103 then analyzes the search command to determine the most suitable process sequence for that search command, generates codes which designate the determined process seauence, and stores the process sequence designating codes 107 into a control block 106. An execution part 109 of the program 103 refers to the codes stored in the control block 106 and processes the search command received by the interface part 104 according to the process sequence designated by the codes, to provide results of the processing to the application program 102 by way of the interface part 104.

During the processing, data required for the processing, but not yet loaded, is loaded into a data buffer area 110 in the main storage 101 from a data page area 141 in a subsidiary storage 102, in such a manner that data elements are separately loaded by units of the data elements contained within a unit area called a data page and having a fixed area size. The data pages are randomly distributed in the main storage 101, and therefore, one of the processes employed according to the present invention is to arrange the data elements stored in a page form to provide the data in a vector structure. Data of a vector structure designates a group of data elements which are spaced from a neighboring element with a constant address interval in the main storage 101. Each data element is referred to a as a vector element, and a group of vector elements is referred to as vector data. If this vectorizing process is designated by the process sequence designating codes 107, the execution part 109 operates to gather the vector data elements, to store the resultant vector data elements into vector area 111, and to store vector designating data concerning the generated vector data into a vector designating data area 108 of the control block 106. The vector designating data in the area 108 comprises an address of the first vector element of the vector data, an increment value designating an address difference or displacement between two neighboring vector elements and the vector length designating the number of the vector elements included in the vector data.

If the process sequence designating codes further indicates processing of the vector data, the execution part 109 sends the vector designating data in the area 108 to vector instructions included in a vector processing routine provided within the execution part. These vector instructions are executed by a data processor 113 in a pipelined manner. The data processor 113 also performs scalar instructions included in the relational data base managing program 103. The data processor 113 will be explained in more detail later in connection with FIG. 4. (An example of a process for the search command.)

In order to facilate the understanding of the purpose and operation of the described embodiment of the present invention, an example of a search command and the process required thereby will be explained prior to description of the detailed operation.

A commodity table 201 shown in FIG. 2A includes the names of commodites and the names of the salesmen in charge of the respective commodities in pairs. A telephone number table 202 shown in FIG. 2B includes names of employees and their EXT telephone numbers in pairs. The search command shown in FIG. 2C includes three parts. The first part 205 including a key word "SELECT" indicates which columns of the tables of FIGS. 2A and 2B should be selected. The second part 206 including a key word "FROM" indicates from which tables data should be extracted. The last part 207 including a key word "WHERE" indicates what conditions must be satisfied by rows of the tables from which data is to be extracted. Therefore, in the present example, the search command 204 indicates that all possible combinations of the salesman and employee columns of the commodity and telephone tables, respectively, should be searched to find the name of the salesman included in the saleman column of the commodity table 201 which coincides with the name of the employee included in the employee column of the telephone number table 202, and a resultant table is to be provided which compirses three columns relating to commodity, salesman, and EXT with the rows of data from the two tables relating to the searched combinations which satisfy the condition. The result 203 of the search is shown in FIG. 2D. For example, the first row (E) of the salesman column of the commodity table 201 coincides with the fourth row (E) of the employee column of the telephone number table 202. Therefore, the commodity X3 belonging to the commodity column in the first row of the commodity table 201, and the EXT telephone number 331 belonging to the telephone number column in the third row of the telephone number table 202 are listed in the first row of the result table 203 as shown in FIG. 2A, along with the coindicent saleman's name E. The data relating to salesman B, G and C are similarly listed. Thus, it is the formation of the table 203 which is ultimately called for by the command 204, and this data toble 203 is to be formed from data stored in page format in the data buffer area 110 or the subsidiary storage 112.

In the embodiment described below, the table data to be processed, such as the commodity table 201 (FIG. 2A) is stored in units of a data page, for example, as shown by 302 in FIG. 5, and these data pages are stored in the subsidiary storage 112 with some data pages being duplicated in the data buffer areas 110. Each data page includes plural slots 304 each of which contains a respective row of data in a particular table, such as the commodity table 201 (FIG. @A). Also, the directing area 114 of main memory 110, as seen in FIG. 1, includes a table definition table, such as 1003 or 1005 in FIG. 12, and row number tables, such as 1004 or 1006 in FIG. 12. The table definition table includes various data elements required to define the data within the table to be processed. The row number table includes the data page address (page number and slot pointer number) for a table to be processed. Based upon a table definition table, such as 1003 or 1005 in FIG. 12, and a corresponding row number table, such as 1004 or 1006 in FIG. 2, the data pages for a particular table are accessed to generate vector data which includes data elements such as X1 to X4 belonging to one of the columns of the table to be processed, such as the commodity column in the commodity table 201 (FIG. 2A) and this vector data is stored in vector area 111. Also generated is vector data designating data, which is stored in the area 108 of control block 106 and includes the starting address of the vector in vector area 111, vector length, and other identifying data for the vector. The vector designating data is supplied to a vector data processing program so that the vector data in the vector area 111 can be accessed by the programs.

When the vector data is to be generated for storage in vector area 111, a list comprising the addresses of the vector elements on the respective data pages is first generated for each column of table data, such as 201 in FIG. 2A. Each list vector includes as its vector elements the addresses for respective data elements within the main storage 101 (FIG. 1) each belonging to a respective column of a table, such as table 201 in FIG. 2A. The vector data is then fetched from the main storage 101 (FIG. 1) based upon the list vector in a pipelined manner. At the same time, the vector data designating data is generated. This process of list vector formation will be described in more detail later.

FIG. 17 shows four data vectors 903, 904, 1503 and 1504 thus generate for the table data shown in FIGS. 2A and 2B.

In the preferred embodiment, a sort operation is done on the vectors 1503 and 1504 (FIG. 17) to genrate the vector data 1801 and 1802 (FIG. 18) which are obtained after arrangement of the vector data 1503 and 1504 in alphabetical order according to employee designation. Thereafter, a join operation is performed by a program which includes vector instructions in order to find the vector data 1902 (FIG. 19) which corresponds to the EXT column of the search result table 203 in FIG. 2D. As the vector data such as 903, 904, 1801 or 1802 shown in FIG. 18 is processed by the last mentioned program, the resultant vector data 1902 is obtained very quickly by means of pipleined processing by the data processor 113. (Instruction format and details of the data processor)

Before going into a detailed explanation of the processing of the system shown in FIG. 1, a brief explanation of the format of a vector instruction will be provided as well as explanation of the details of the data processor 113.

Referring to FIG. 3, the first 8 bit part 1608 of the instruction 1601 indicates the kind of instruction and, in this example, "A4" is a hexadecimal representation showing that this instruction 1601 is a vector instruction. The next two fields 1609 and 1610 designate two general registers $R_1$ (1603) and $R_2$ (1605) within the data processor 113 respectively including indication of the vector length and an operand descriptor address. The next field is a base field (B) 1611 which designates a general register 1602 storing a base value. The least significant 8 bits of the base value and the displacement part (D) 1612 of the instruction 1601 indicates what kind of vector instruction the instruction 1601 is.

A vector can be designated by the first element address and its increment value, as exemplified by the vector descriptor 1607. The operand descriptor 1606 holds three addresses for three operand vector descriptors and a control vector address. The address of the operand descriptor 1606 is designated by the address included in the general register $R_2$ (1605) whose address is designated by the $R_2$ field (1610) of the instruction.

Figure 4:
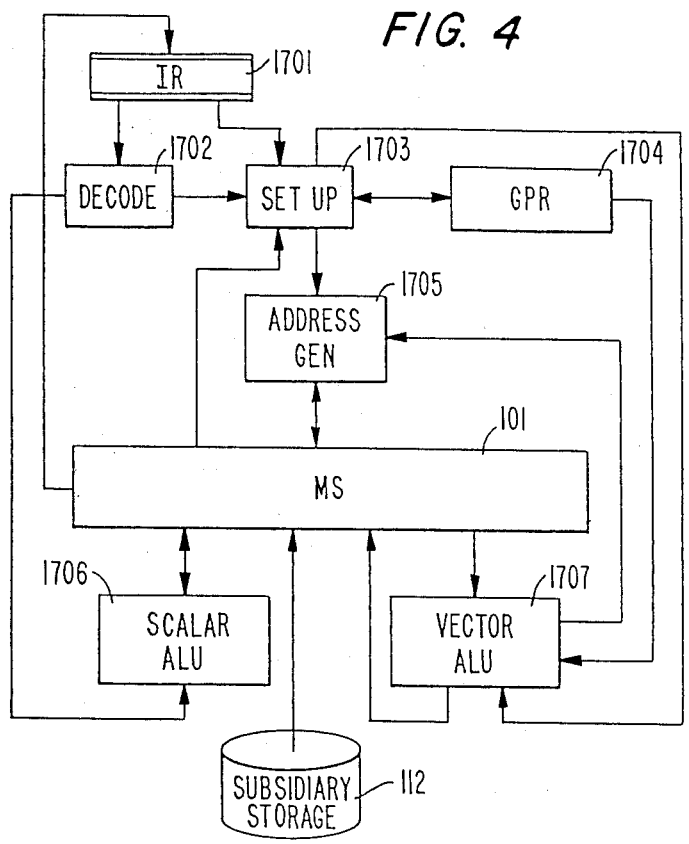
FIG. 4 is a more detailed schematic block diagram of the data base managing system in FIG. 1.

FIG. 4 shows a more detailed diagram of the data base managing system of FIG. 1. The system in FIG. 4 is realized by a M-280H with an integrated array processor, manufactured by Hitachi Ltd., Japan. An instruction read out of the main storage 101 and held by the instruction register 1701 is decoded by the decoder 1702 based upon the first 8 bit field 1608 of the instruction 1601. If the decoded instruction is a scalar instruction, a scalar ALU 1708 is activated, while if the decoded instruction is a vector instruction, such as a VEA instruction, which will be explained later on in connection with FIG. 15, a set up circuit 1703 is activated. The set up circuit 1703 reads out one of the general registers 1704 designated as a base register by the instruction in the instruction register 1701, and the kind of instruction is detected based upon the sum of the content of the general register designated as the base register by the instruction and the displacement field (A) of the instruction, to indicate the detected kind of vector instruction to the vector ALU 1709, which is comprised of a pipelined ALU. The set-up circuit 1703 reads the vector length from a general register designated by the $R_1$ field 1609 of the instruction 1601 to send the vector length to the vector ALU 1709. The set-up circuit 1703 reads out an operand descriptor address from a general register designated by the $R_2$ field 1610 of the instruction 1601, reads out an operand descriptor 1606 based upon the read out operand descriptor address, and, based upon the contents of the read out operand descriptor, reads out vector descriptors. The first element address and an increment included in each vector descriptor are sent to an address generator 1705. Thus, set-up of various data is finished, and the set-up circuit 1703 starts the vector ALU 1709. The address generator 1705 successively generates addresses for operand addresses to access the main storage 101 thereby. The operand vector elements accessed by the address generator 1705 are sent to the vector ALU 1709 successivly and the resultant vector elements are successively sent from the vector ALU 1709 for example to the main storage 101. The operation by the vector ALU 1709 is continued until all elements designated by the vector length have been operated on. As the operation by the vector ALU 1709 and access to the main storage 101 are repeated by a pitch of one machine cycle, the total operation finishes very quickly.

Figure 11:
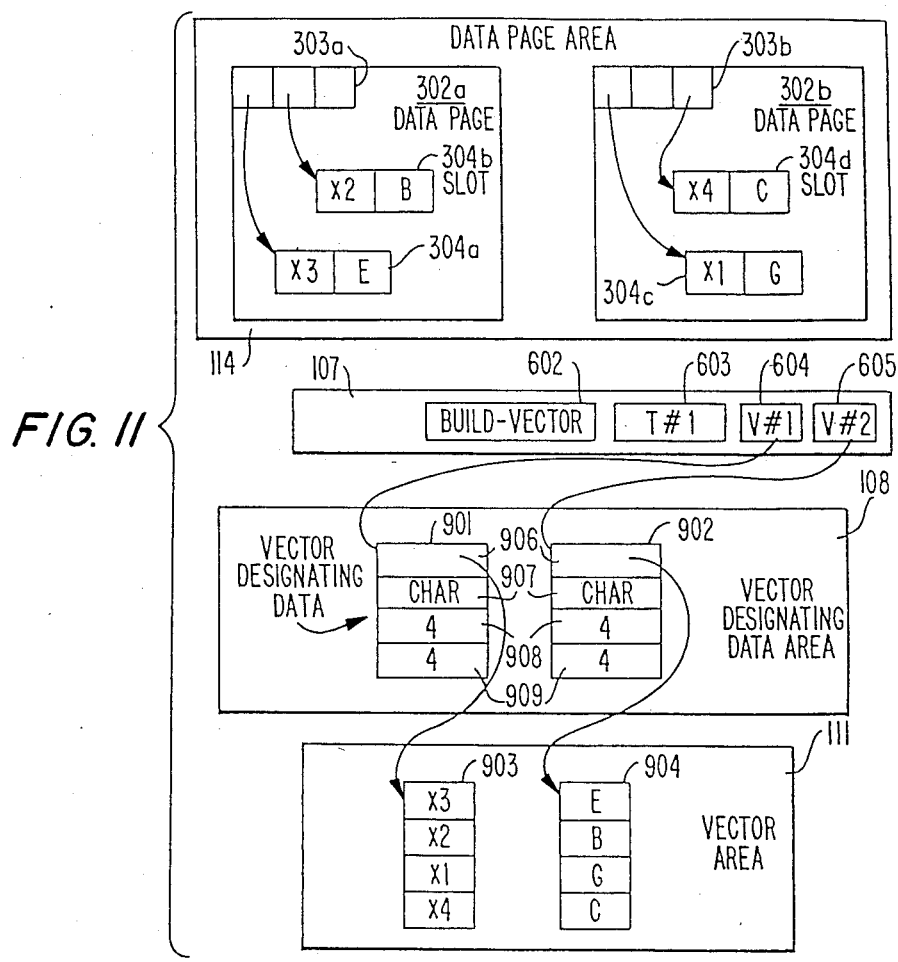
FIG. 11 is a diagram of vector type data obtained from page type table data by means of the execution part (109) of FIG. 1.
Figure 14:
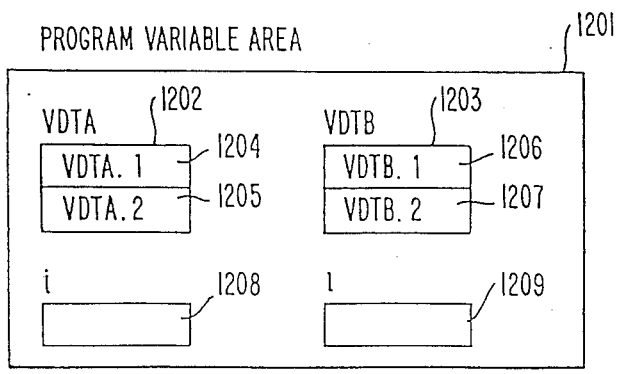
FIG. 14 is a diagram of various program variables used in the BUILD-VECTOR routine (1–7) of FIG. 9.
Figure 16:
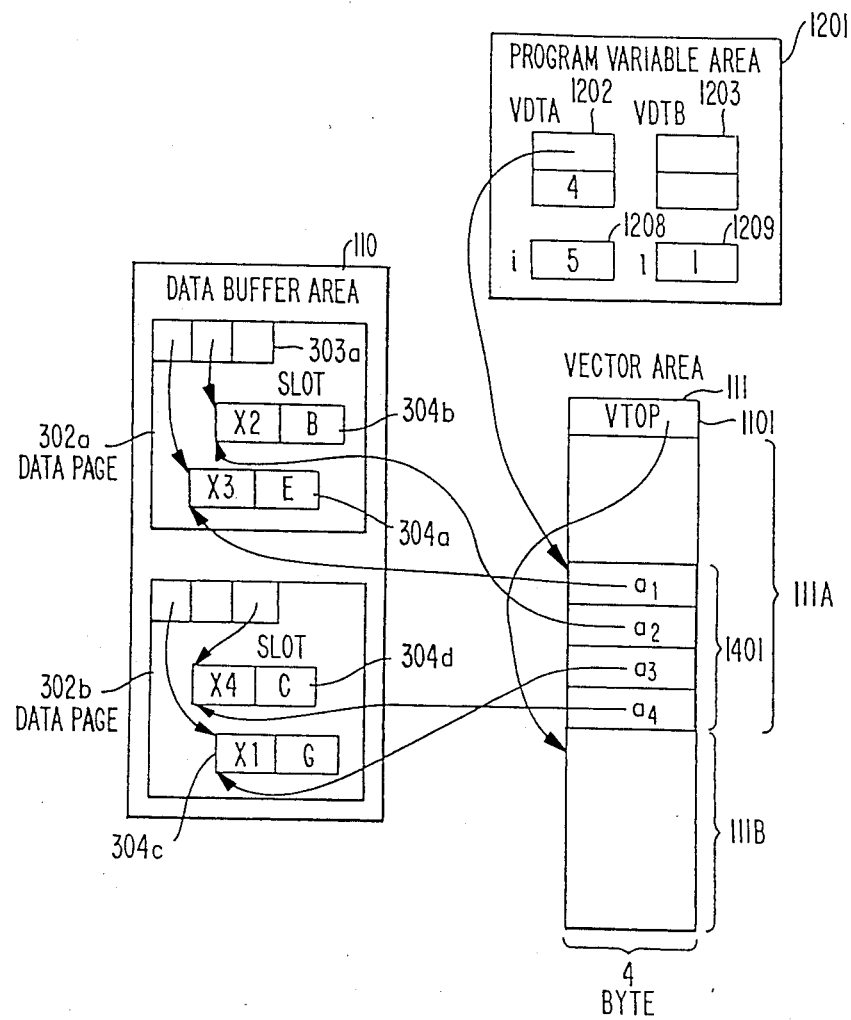
FIG. 16 is a diagram of variables and a list vector formed in an intermediate state of the BUILD-VECTOR routine (107) of FIG. 9.

The result of an operation by the vector ALU 1709 may be provided to one of the general registers as scalar data, or to the address generator 1705 as a list vector depending upon the vector instruction. The usage of a list vector by the address generator is necessitated for a VMSX instruction, which will be explained later on in more detail. In an operation of this instruction, a list vector, for example, comprising addresses $A_1$ to $A_4$ as shown by a vector 1401 in FIG. 16, is read out as a result of accesses by the address generator to the main storage 101. The read out list vector elements are successively sent to the vector ALU 1709, which passes the read out elements to the addresses generator 1705, which stores the elements within a storage device (not shown). After all list vector elements are read out of the main storage 101, the address generator 1705 provides the read out list vector elements to the main storage 101 as access addresses therefor. In reference to the addresses, the vector elements, for example, X3, X2, X1 and X4 shown in FIG. 11 are successively read out from the main storage 101, and passed through the vector ALU 1709 to the main storage 101 to be stored therein at a storage location designated by the second operand of the VMSX instruction. Therefore, the address generator 1705 accesses the main storage 101 at different locations for different vectors in parallel, so that, for example, a vector is read out from the main storage 101 while another vector is being written into the main storage 101 in parallel to the reading operation.

(Data storage form)

The operation explained in conection with table data shown in FIGS. 2A to 2D strongly depends upon how the tables are actually stored, i.e., how easy it is to access the data in the tables. As was explained previously, it is benefcial to store data belonging to a table separately in units of a data page, from the standpoint of easiness of insertion or deletion of data elements. The same storage form is employed in this embodiment. The details of a data storage form will be given hereinafter with reference to FIG. 5. A data page area 114 in the subsidiary storage is divided into a plurality of data pages. A data page 302 includes plural data storage areas 304 referred to as a slot. Each slot 304 includes all entries belonging to one row of a table. For example, in the case of a slot for the first row of the table 202 of FIG. 2B, data "A, 316" is stored in the slot. Each slot has its own slot number. Each data page 302 includes slot pointers 303 each indicating a starting address of a respective one of the slots 304 within the same data page 302. The slot pointers are stored at an area starting from the start address of the data page and according to the order of the corresponding slot numbers.

As is clear from the structure of the data page, a storage location of a row within the subsidiary storage 112 (FIG. 1) can be designated by a data page number i and a slot number j. Therefore, the combination 301 of the data page number i and the slot number j is called a row number.

According to this form of storage of data, it is possible to change only the slot pointer without chaning the row number, when a location of a slot within a data page or the length of a slot is changed. Therefore, this storage form is advantageous for deletion or insertion of a new row of data or for storage of data with a variable length.

(Data buffer area 110 and data buffer directory 401)

When a data page 302 in a subsidiary storage 112 is to be processed by the relational data base managing program 103, the data in the data page 302 is transferred to a data buffer area 110 within a main storage 101 before the processing.

The data buffer area 110 is divided into data buffer units as shown in FIG. 6. Each data buffer unit has its own number, has the same size as the data page 302, and stores a copy of the necessary data page 302. In connection with the data buffer area 110, there is provided a director area 114 within the main storage 101. The directory area 114 includes a data buffer directory 401 which indicates which data buffer is stored in which one of the data buffer units. For example, when data within the i-th data page is stored in a k-th data buffer unit, a pair consisting of the data page number i and the data buffer unit number k is stored in the data buffer directory 401.

(Row number transformation)

A transformation from a row number comprising a page number i and a slot number j to a corresponding storage address of the data for that row within the main storage is carried out in accordance with the sequence of steps in FIG. 7.

At first access is made to the data buffer directory 401 to find whether or not any of the data buffer units hold data read out from the i-th data page (step 502). If a k-th data buffer unit is found to be holding the data, the number k is obtained from the data buffer directory 401. If not, the data in the i-th data page is read out to an empty one of the data buffer units, a pair consisting of the number i of the data page and the number, say k, of the empty data buffer units is written into the data buffer directory 401 (step 503), and then the step 504 if performed. When there is no empty data buffer unit available for the operation of the step 503, a pair consisting of a data buffer number of an appropriately selected data buffer unit and a corresponding data page number is deleted from the data buffer directory 401, and then the step 503 is performed. The selection of the appropriate data buffer unit can be done, e.g., according to the well-known least-recently-used algorithm. Next, an address, say x, of the j-th slot within the k-th data buffer unit is obtained, based upon the data buffer number k, and the j-th slot pointer which indicates the address x (step 505).

The directory area 114, includes a plurality of row number tables 1004 and 1006 (FIG. 12) in correspondence to a respective one of the data tables such as the commodity table 201 (FIG. 2A) and telephone number table 202 (FIG. 2B) to be processed by the program 103 (FIG. 1). The table 404 in FIG. 6 shows one of those row number tables as an example. Therefore, we pick up sequentially row numbers listed in a selected one of the row number tables and sequentially transform each picked up row number into a corresponding address within the main storage, then we can access the data for the row within a selected one of the data tables 201 (FIG. 2A) and 202 (FIG. 2B). In this way, we can access any row within a data table referred to by 201 or 202 to be processed by the program 103 and therefore, any row within any data table to be processed by the program 103.

(Generation of process sequence designating codes)

Figure 8:
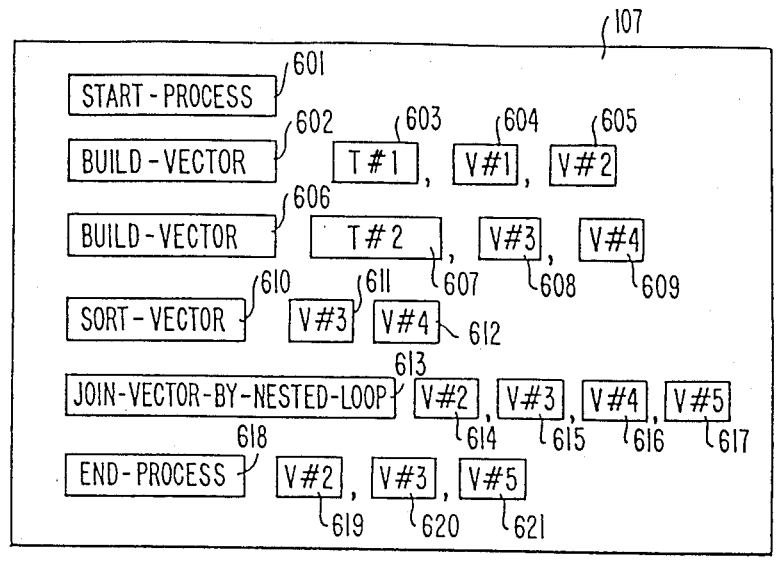
FIG. 8 is a diagram of a process sequence designating codes used in the data base managing system of FIG. 1.

A search command, for example, as shown in FIG. 2C, is transferred from an application program 102 by way of the interface part 104 of the managing program. The analysis part 105 responds to this search command by determining a process sequence which is judged to be the best according to a selected standard, and provides the process sequence designating code, as shown in FIG. 8. The method of determining the best process sequence by the analysis part 105 is known, for example, in literature by P.G. Selinger et al, "Access Path Selection in a Rational Database Management System" (Prox. ACM SIGMOD Conf. 1979). The code comprises plural process designating sentences. In FIG. 8, each line forms one process designating sentence. Each process designating sentence includes a key word 601, 602, 606, 610, 613 or 618 each designating the kind of process to be performed, and parameter designating parts 603 to 605, 607 to 609, 611 to 612, 614 to 617 or 619 to 621, relating to a respective process.

(Execution of the process sequence designating code)

Figure 9:
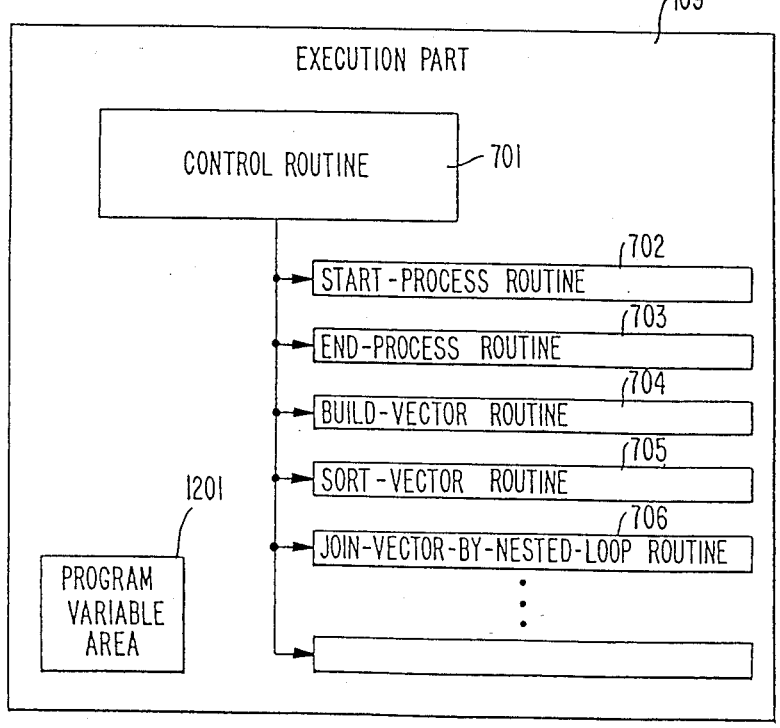
FIG. 9 is a schematic diagram of an execution part within the data base managing system of FIG. 1.

The execution part 109 of the program 103 includes, as shown in FIG. 9, a CONTROL routine 701, a START-PROCESS routine 702, END-PROCESS routine 703, BUILD-VECTOR routine 704, SORT-VECTOR routine 705, JOIN-VECTOR-BY-NESTED-LOOP routine 706, and so on. Each routine corresonds to a respective one of the key words included in the process sequence designating code 107 generated by the analysis part 105 of the program 103.

The execution part 103 has a program variable area 1201 which stores program variables used by the routines mentined above.

(1) Control routine (701).

This routine first checks whether or not there is any next process designating sentence within the process sequence designating code 107 given by the analysis part 105 (step 802). If there is any, it takes the next process designating sentence out of the process sequence designating code 107 (step 803), calls for a corresponding one of the process routines 702 to 706, to provide a parameter included in the process designating sentence to the corresponding process routine, and to start it (step 804). These steps 802 to 804 are repeated until there is no next process designating sentence.

(2) START-PROCESS routine (702).

This routine is stared by the CONTROL routine 701, when the CONTROL routine 701 takes a key word "START PROCESS" 601 shown in FIG. 8 out of the process sequence designating code 107. This routne 702 initializes the vector designating data area 108 and the vector area 111.

(3) BUILD-VECTOR ROUTINE (704).

In case of the process sequence designating code 107 shown in FIG. 6, this routine 704 is started by the CONTROL routine 701, when the operation of the START-PROCESS routine ends and the next key word "BUILD-VECTOR" is read out by the CONTROL routine 701. This routine 704 changes data stored with a form shown in FIG. 5 to a vector structure. That is, all entries of all rows of a table designated by the first parameter 603 are fetched from the data page area 141, and stored in the vector area 111 separately for each column and with a vector structure. The second and third parameters 604 and 605 in FIG. 8 each indicate a start address of a first and second storage area within the vector designating data area 108 wherein vector designating data regarding the first and second vector respectively comprising the data elements belonging to the first and the second columns of the selected table to be processed by the program 103 are to be stored. If we presume that the table selected by the first parameter 603 to be processed by the program 103 is the table 201 in FIG. 2A, then the operation will be more easily understood by referring to FIG. 11, wherein it is assumed that the first and second rows of the table 201 (FIG. 2A) are stored in the first and second slots 304a, 304b in a data page 302a within a data page area 141 but the third and fourth rows are stored within the first and second slots 304c, 304d in another data page 302b. The reference numbers 303a 303b in FIG. 11 are the slot pointers. At first, we will explain data which are obtained as a result of the execution of the BUILD-VECTOR routine 703. A vector 903 and a vector 904 comprise the data elements included respectively in the first and second columns of the table 201 of FIG. 2A. These two vectors 903, 904 show data of a vector structure produced as a result of the execution of the BUILD-VECTOR routine 704. The vector designating data 901 or 902 held in the vector designating area 108 and includes the first element address 906, an element type 907, an element length 908, and an element number 909. The two reference numerals 901 and 902 respectively represent vector designating data for the vectors 903 and 904. These two data 901 and 902 shows two vector designating data which are produced as a result of the execution of the BUILD-VECTOR routine 704. The start address of the vector designating data 901 or 902 is designated by the second or third parameter 604 or 605 of the second sentence.

The first entries of the two vector designating data 901 and 902, respectively, designate the first element address of the vectors 903 and 904. The second entries "CHAR" of the two data 901 and 902 represent that the elements of the vectors 903 and 904 are both of a character type. The third entries "4" of the two data 901 and 902 show that the element lengths of the two vector data 903 and 904 are both 4 bytes. The fourth entries "4" of the two data 901 and 902 show that the element numbers of the two vector data 903 and 904 are both of a character type. The third entries "4" of the two data 901 and 902 show that the element lengths of the two vector data 903 and 904 are both 4 bytes. The fourth entries "4" of the two data 901 and 902 show that the element numbers of the two vector data 903 and 904 are both 4.

Before giving a detailed explanation of the BUILD-VECTOR routine 704, includng the generation of the vector designating data 901 or 902, an explanation will be given regarding data required for the operation of this routine 704.

Figure 12:
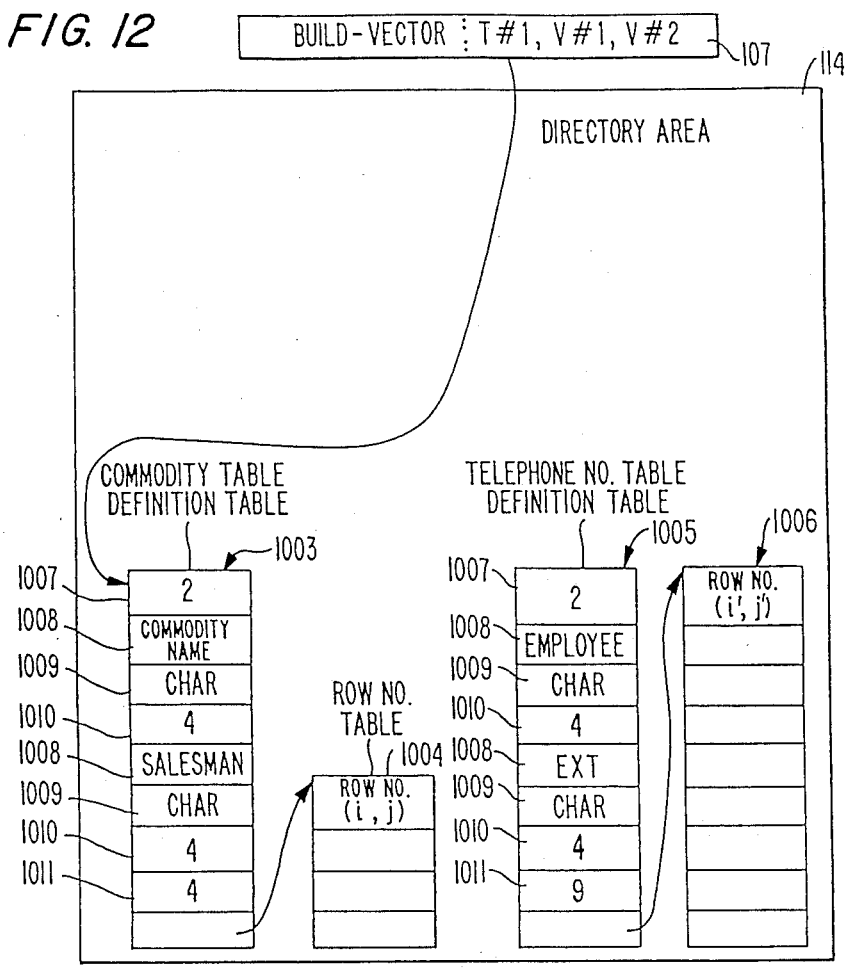
FIG. 12 is a diagram of various table definition tables used in connection with the BUILD-VECTOR routine (107) of FIG. 9.

FIG. 12 shows a table included in the directory area 114. A reference numeral 1003 or 1005 shows an example of a table definition table for the commodity table 201 (FIG. 2A) or the telephone number table 202 (FIG. 2B). A reference number 1004 or 1006 represents a related row number table. Each table definition table includes a number of columns 1007, plural groups of entries such as shown by 1008 to 1010, a number of rows 1011 and a start address of a related row number table 1002. Each group of entries includes a column name 1008, a column element type 1009 (i.e., a character type or a numeral type), and a column element length 1010 in bytes.

The row number table 1004 or 1006 includes a list of all row numbers belonging to a corresponding table.

A start address of a table definition table 1003 or 1005 is indicated by the first parameter of a process designating sentence including a key word "BUILD-VECTOR". In case of the designating sentence shown in FIG. 10, the first parameter T#1 designates the start address of the commodity table definition of table 1003.

Figure 13:
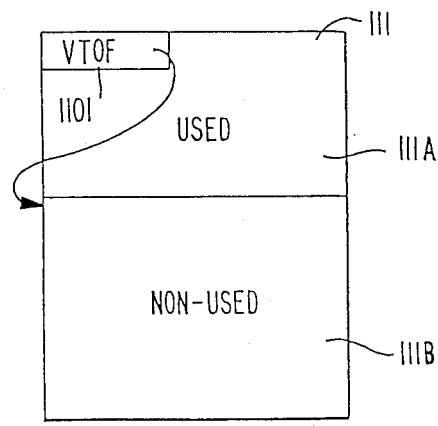
FIG. 13 is a diagram of the vector area (111) of FIG. 1 separated into used and non-used areas (111A and 111B)

A VTOP entry 11+1 (FIG. 13) provided at the start address of the vector area 111 represents the start address of the non-used area 111B of the vector area 111. A new vector data is stored from the starting area of the non-used area 111B, and not in the used-area 111A.

Program variables used in the BUILD-VECTOR routine 704 will be explained hereinafter in connection with FIG. 4. The variables comprise VDTA (1202), VDTB (1203), i (1208) and 1 (1209), all provided in the program variable area 1201. VDTA (1202) includes VDTA.1 (1204) and VDTA.2 (1205). VDTB (1203) also includes two entries VDTB.1 (1206) and VDTB.2 (1207). VDTA (1202) and VDTB (1203) are variables used in order to describe vectors generated by the BUILD-VECTOR routine. i and j are program variables used in order to count a loop number.

Figure 15:
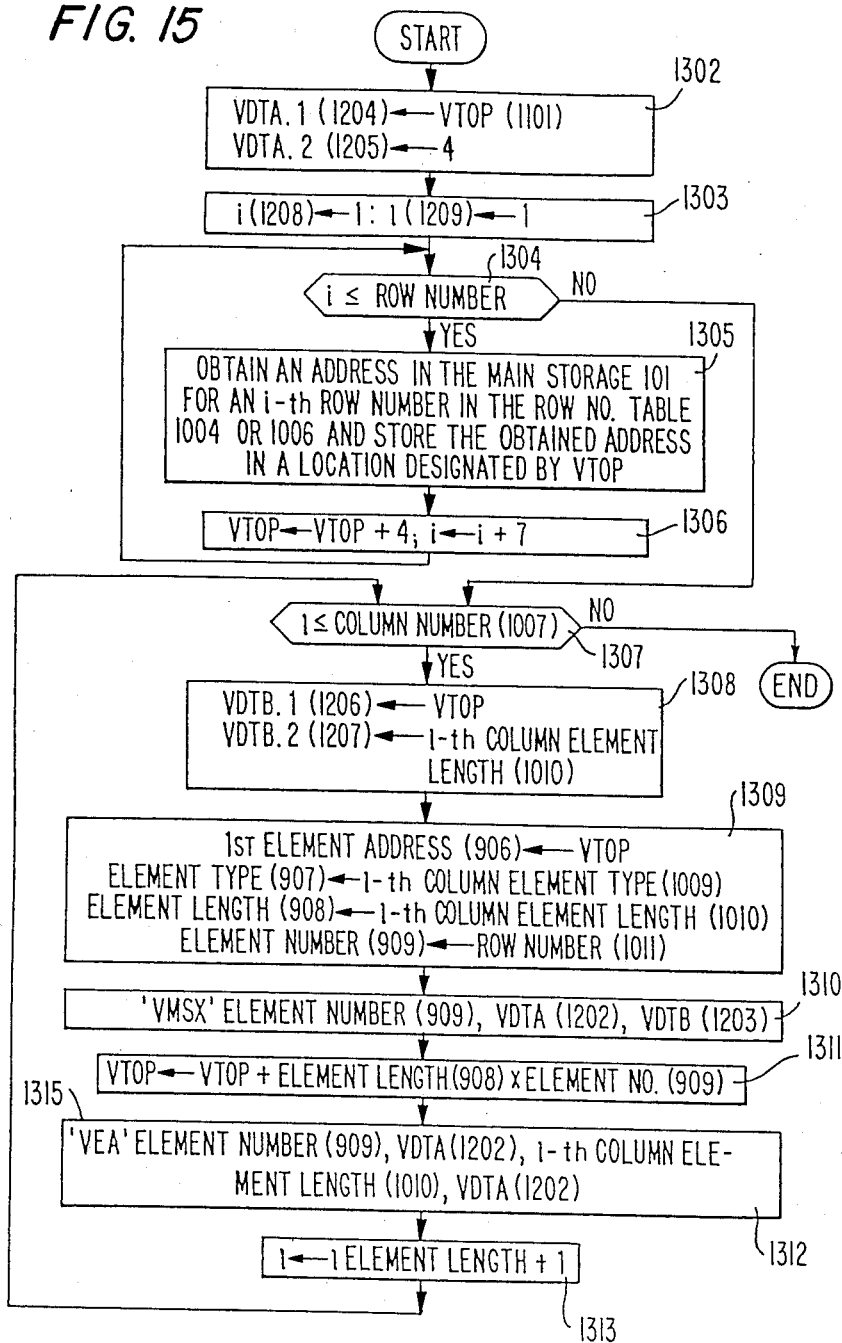
FIG. 15 is a flow chart of the BUILD-VECTOR routine (107) of FIG. 9.

Hereinafter, a detailed explanation of the operation of the BUILD-VECTOR routine 704 will be given, by referring to FIG. 15.

At first, a value VTOP (1101) which designates a start address of the non-used region 111B (FIG. 13) is set in the variable VDTA.1 (1204), and a row number "4" in a row number entry of the commodity table definition table 1003 is set in the variable VDTA.2 (1205) (step 1302). An initial value of "1" is set in the variables i (1208) and 1 (1209) (step 1303). In a loop of steps from 1304 to 1306, addresses A1 to A4 in the main storage 101 are obtained sequentially for all rows in a table selected by the first parameter 6, in this example, T#1 related to a key word "BUILD-VECTOR", and each obtained address ai(i=1~4) is stored in a location starting from an address designated by VTOP (1101) (step (1305). By changing VTOP by four each time when one of the four addresses A1 to A4 is obtained (step 1306), a vector can be stored in the vector area 111 which comprises four vector elements of thus obtained addresses A1 to A4. The amount "4" of each increase of VTOP (1101) is predetermined by the bit length of the addresses A1 to A4. The data "4" provided to VDTA.2 (1205) also represents the same length. The method of obtaining the addresses as shown by step 1305 was already explained in connection with FIG. 7.

FIG. 16 shows an example of data obtained after the steps 1304 to 1306 have been applied to a process designating sentence starting from the key word "BUILD-VECTOR" 602 shown in FIG. 8. It can be seen that a vector 1401 is comprised of elements of addresses A1 to A4 respectively pointing to row entries for the commodity table 201 (FIG. 2A). Hereinafter, a vector, like a vector 1401, which is comprised of elements which are address pointers to some other data is called a list vector. In VDTA.1 (1204) in the program variable area 1201 is stored the start element address of the vector 1401. VTOP (1101) designates a start address of the non-used area 111B, which is adjacent to a storage location of the element A4.

According to a loop comprising steps 1307 to 1313, a vector designating data and a vector for each column within the table 201 (FIG. 2A) is formed on a vector area 111. In case of a process designating sentence starting from the key word "BUILD-VECTOR" 602 shown in FIG. 8, the vector designating data 901 and 902 and vectors 903 and 904 respectively comprising the first and second column entries are generated. The same processing is repeated by the same number as the column number in the entry 1007 of the table definition table 1001, ("2" in case of the commodity table definition table 1003). The program variable 1 (1209) designates a loop number, that is, what column is being processed. If 1 is smaller than a column number stored in the entry 1007 of the table definition table 1001 ("2" in case of the commodity table definition table 1003) (step 1307), the steps 1308 to 1313 are performed in order to generate a vector for the 1-th column. That is, at first, in VDTB.1 (1206) is stored a VTOP (1101) which represents the start address of the non-used area 111B of the vector area 111 (step 1308). As a new vector for a new column is stored at locations starting from the top of the non-used area 111, VDTB.1 (1206) designates the first element address of the new vector to be generated. In VDTB.2 (1207) is stored the 1-th column element length stored in the entry 1010 to the table definition table 100 ("4" in case of any column of the commodity table definition table 1003) (step 1308). As the vector for a column is arranged on a continuous area on the vector area 111, the address distance between two neighboring vector elements, that is, the increment value, is equal to the vector element length. Therefore, VDTB.2 (1207) now holds an increment value for a vector to be generated from now on, as a result of the setting of the vector element length into VDTB.2 (1207). Thus, the step 1308 finishes. Next, vector designating data is generated (step 1309). That is, necessary information is taken out of the table designating table (e.g., table 1003 case of the commodity table) designateed by the first parameter (e.g., T#1 (603) in FIG. 6) in a process designated sentence including the key word BUILD-VECTOR, and is written into a vector designating data area located at a location designateed by the (1+1)-th paramter (e.g., V#1 (604) or V#2 (605) in FIG. 6) within the same process designating sentence. As was explained before, the first element address of a vector for a column element is equal to VTOP (1101), VTOP (1101 is written into the first element address area 906). To the element type entry 907, the element length entry 908, and the element number entry 909 are transferred the 1-th column type 1009, the 1th column length 1010 and the row number 1011 all provided from the table designating table 1003 or 1004 (step 1309). In cases of the first and second columns of the commodity table 201 (FIG. 2A), the vector data designating data 901, 902 shown in FIG. 9 are generated. The next step 1310 is a step of execution of a vector instruction. VMSX is a name of a vector instruction, and VDTA (1202) and VDTB (1203) each designate a vector which becomes an operand of this VMSX instruction. An operand vector can be designated by its first element address and its increment. As is clear from the explanation in connection with the steps 1304 to 1306, VDTA.1 (1204) and VDTA. 2 (1205) respectively designates the first element address and the increment value of the list increment value of the list vector generated by these steps and shown by 1401 in FIG. 16, and includes elements A1 to A4 which designates locations of slots 304a to 304d within the commodity table 201 (FIG. 2A). VDTB.1 (1206) and VDTB.2 (1207) designates the first element address and the increment value of a vector which should be formed as was explained before. The operation of the VMSX instruction is to read out column elements whose addresses are respectively designated by the elements A1 to A4 of the list vector designated by the VDTA 1202 and store the read out elements as the vector elements designated by VDTB (1203) (step 1310).

As the initial value of the list vector elements A1 to A4 designates the addresses of the elements belonging to the first column of the commodity table 201 (FIG. 2A), the vector 903 (FIG. 11) is generated as a result of the first execution of the VMSX instruction.

The execution of this VMSX instruction by the system in FIG. 4 was explained before in connection therewith. As a result of the operation of the VMSX instruction, the vector area 111 is used by the size of the 1-th column vector, and, therefore, the VTOP, which represents the top address of the non-used area, is changed by the size, that is, the product of the vector element length 909 and the vector element number 908 (step 1311). Before the generation of the (1+1)-th column element length to each element of the list vector designated by VDTA (1202), because at this moment each element of the list vector element designates the address of the 1-th column element of the 1-th slot. The next vector instruction VEA is an instruction which requests this addition. That is, the 1-th column element length is added to the j-th element of a list vector designated by the VDTA 1202 and the resultant sum is stored as the j-th element of the list vector, and this operation is repeated for elements corresponding to j=1 to j=the 1-th column element number (909) (step 1315). As a result of the operation of the VEA instruction 1315, each element of the list vector designated by the VDTA 1202 designates the (1+1)-th column element address for a corresponding row position. After 1 is increased by 1 (step 1209), the steps 1307 to 1313 are repeated, until all vectors for all columns are formed (step 1307). Thus, the process for the BUILD-VECTOR routine finishes and the CONTROL routine 701 again is informed of the end of the BUILD-VECTOR routine. The next process designating sentence is read out, and as it includes the same key word "BUILD-VECTOR" in the example of FIG. 8, the same procedure as above is performed or the telephone number table 202 in FIG. 2B. FIG. 17 shows vectors 903, 904, 1503, 1504 and vector designating data 901, 902, 1501, 1502 thus obtained for the commodity table 201 and the telephone number table 202 shown in FIGS. 2A and 2B.

Figure 5:
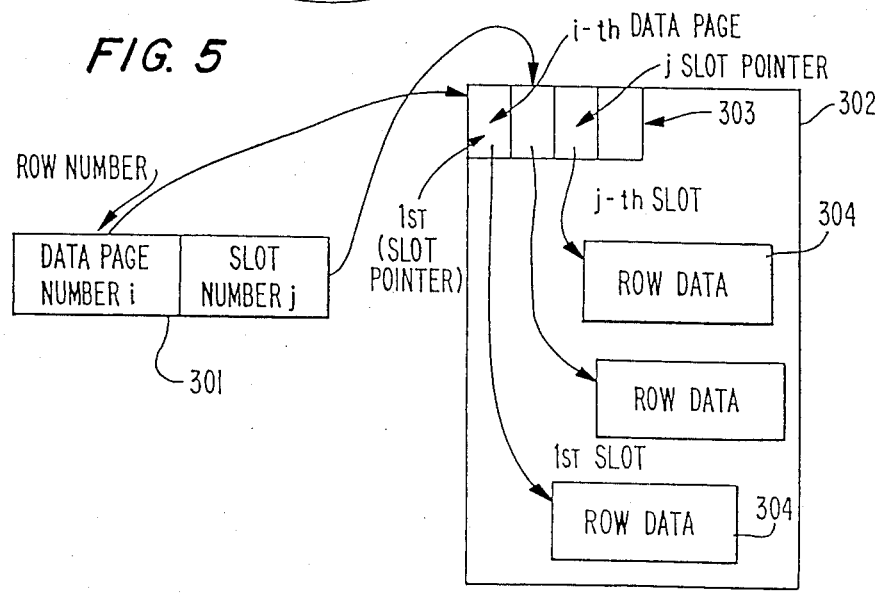
FIG. 5 is a diagram of the data arrangement for page type data.

It is to be noted that in the low chart of FIG. 5 the format shown in FIG. 3 was simplified. The first 8 bits of the instruction 1601 was expressed by a mnemonic expression such as "VMSX" or "VEA". The number $R_1$ of a general register which stores the vector length (i.e., vector element number) was replaced by the vector length itself. The number $R_2$ of a general register which stores an operand descriptor address was replaced by the descriptor, e.g., VDTA or VDTB. Furthermore, the base (B) or dislacement (D) fields have been omitted. The same simplified representation of an instruction format will be adapted even hereinafter.

In order to allow the results of the BUILD-VECTOR routine to be used by other instructions, shown in FIG. 3, it is necessary to make the results available for the subsequent instructions. For that purpose, the folowng procedures are required. The vector length for a respective column should be transferred to a corresponding one of the general registers from the element length field 908 (FIG. 11) of a corresponding vector designating data 905, (FIG. 11) so that an instruction can use the data by designating the register by its $R_1$ field 1609. Similarly, vector descriptor 1607 already explained should be formed based on the first element address field 906 (FIG. 11) and the element length 908 (FIG. 11). The operand address descriptor 1606 should be prepared beforehand and its start address should be stored in the general register $R_2$, and as the first entry, the start address of the descriptor 1607 should be stored as the first operand vector descriptor address. Similarly, the second and third vector descriptor addresses for the second and third operand descriptors should be recorded before the vector instruction 1601 is executed.

(5) SORT-VECTOR routine 705.

The next process designating sentence includes a key word SORT-VECTOR 610. The routine 705 for this key word arranges the vector elements of a vector designated by vector designating data designated by the first paramter 611 of the sentence, according to the ascending order of the values of the vector elements. The vector elements designateed by the vector designating data designated by the second parameter 612 are arranged according to the same arrangements of the vector elements designated by the first parameter 611. These arrangments can be performed by a known algorighm called a merge-sort method which is explained, for example, in "The Art of Computer Programming", Vol. 3, "Sorting and Searching" by Knuth, D. E. This sort can be done by plural scalar instructions without using any vector instruction. FIG. 18 shows a vector 1801 which was obtained after this SORT-VECTOR routine 705 is performed on the vector 1503 shown in FIG. 17. In this example, the vector 1503 is arranged in alphabetical order, as alredy mentioned. FIG. 18 also shows a vector 1802, which has been obtained as a result of the alphabetical arrangement of the vector 1503 to frrm the vector 1801.

(6) JOIN-VECTOR-BY-NESTED-LOOP routine (613).

After an end of the SORT-VECTOR routine 705, the next process designating sentence including the key word "JOIN-VECTOR-BY-NESTED-LOOP" is read out by the CONTROL routine 701, and the routing 613 for the key word is started.

This routine calls for a search as to where in the vector 1801 designated by the vector designating data 1501 which is designated by the second parameter there is an element which has the same value, for example, x1, as a respective element of the vector 904 designated by the vector designating data 902 designated by the first parameter 614. When a vector element within a vector 1801 is detected which is equal to x, a vector element in a vector 1802 which belongs to the same row as the detected element in the vector 1801 is storeed in a vector 1902. The vector 1802 is designated by vector designating data 1502 which is designated by the third parameter 616. The vector 1902 is designated by a vector designating data 1901 which is designated by the fourth parameter 617. For example, if we search for a vector element with the vector 1801 which is the same as the first element "E" of the vector 904, the fifth element "E" of the vector 1801 is detected at that vector element. Therefore, the fifth vector element "331" of the vector 1802 is taken and is stored as the first element of the vector 1902. The same search is done for each vector element, to obtain the vector 902. The vectors 904 and 1801 correspond to the salesman column of the commodity table 201 (FIG. 2A) and the employee column of the telephone number table 202 (FIG. 2B). Therefore, the search mentioned above corresponds to the search condition 207 in FIG. 2C.

Figure 19:
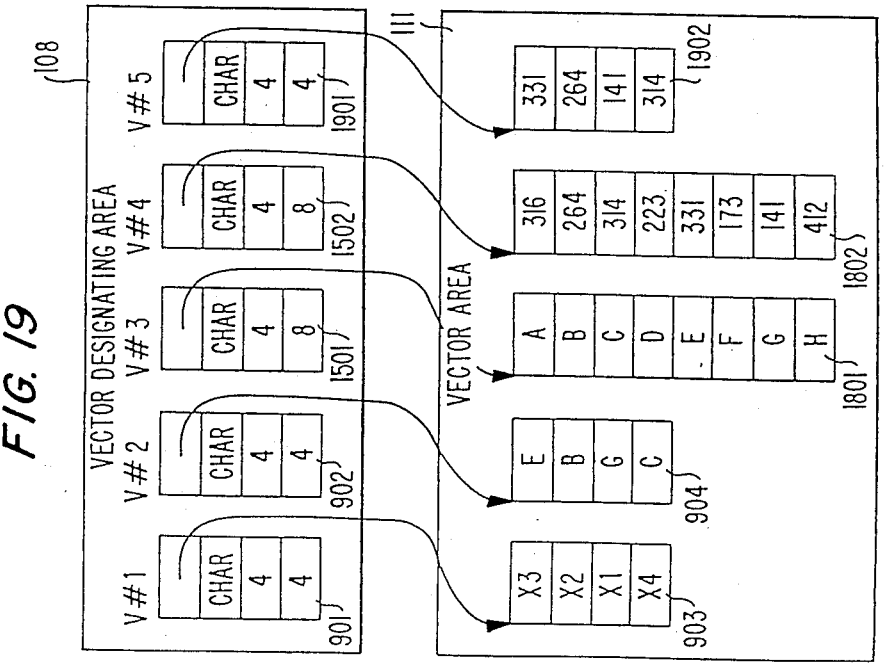
FIG. 19 is a diagram of data after execution of the JOIN-VECTOR-BY-NESTED-LOOP routine (706) of FIG. 9.

FIG. 19 shows the result after the routine 613 is completed. The vectors 903, 904, and 1802 represent the commodity column, the salesman column and the EXT telephone number column of the result 203 (FIG. 2D) which is what the search command calls for.

Figure 20:
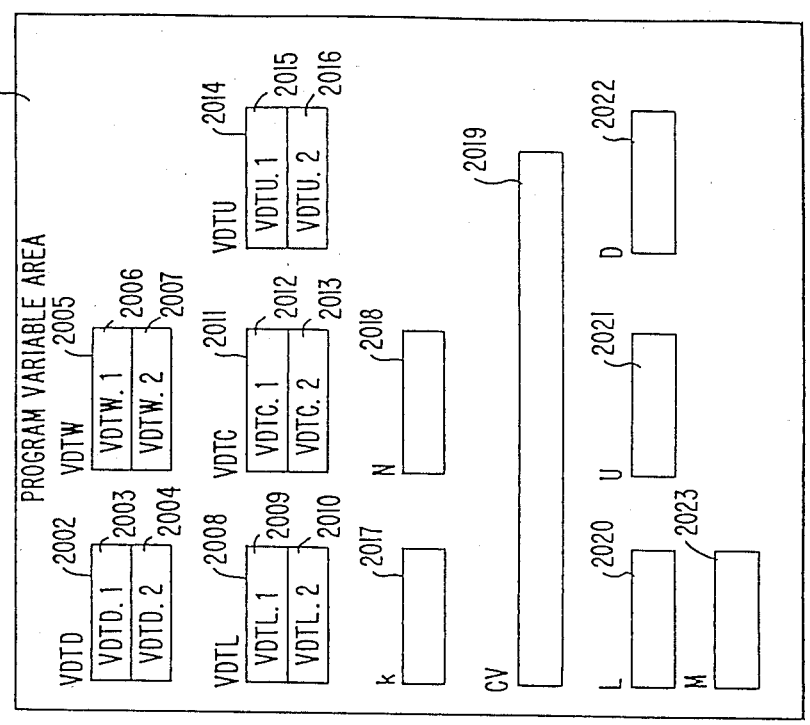
FIG. 20 is a diagram of various variables used in the JOIN-VECTOR-BY-NESTED-LOOP routine (706) of FIG. 9.

The JOIN-VECTOR-BY-NESTED-LOOP routine 706 will be explained in more detail hereinafter. FIG. 20 shows a program variable area 2001 for this routine 706, and includes five vector descriptors comprising VDTD (2002), VDTW (2005), VETL (2008), VDTC (2011) and VDTU (2014). The VDTD designates the vector 904 of FIG. 19. VDTW, VDTL, VDTC, and VDTU all designate vectors for work, and the vector designated by VDTW becomes the vector 1902 at the end of the processing of the routne 706. VDTL, TVTC and VDTL each designate a list vector. A variable k (2017) designates a loop number, and the constant N (2018) has a vector element number of the vector 904. CV is called a control vector, and includes a series of bits used to control vector processing. A variable L (2020) includes the first element address of the vector 1801, and a varible U (2021) includes the difference between the two first element addresses of the vectors 1801 and 1802. A variable M (2023) stores an element number of the vector 1801.

Details of the operation of the JOIN-VECTOR-BY-NESTED-LOOP routine 706 will be explained hereinafter by referring to FIGS. 21A to 21C.

Figure 21A:
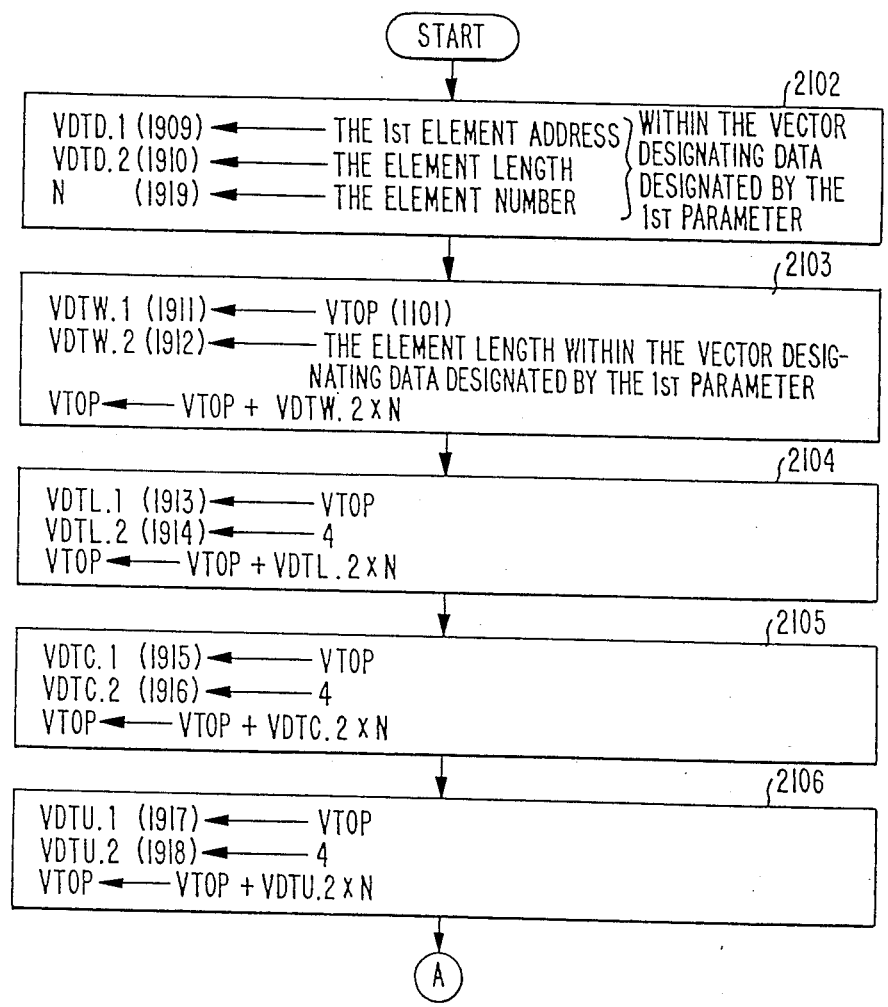
FIGS. 21A to 21C in combination comprise a flow chart of the JOIN-VECTOR-BY-NESTED-LOOP routine (706) in FIG. 9.
Figure 21B:
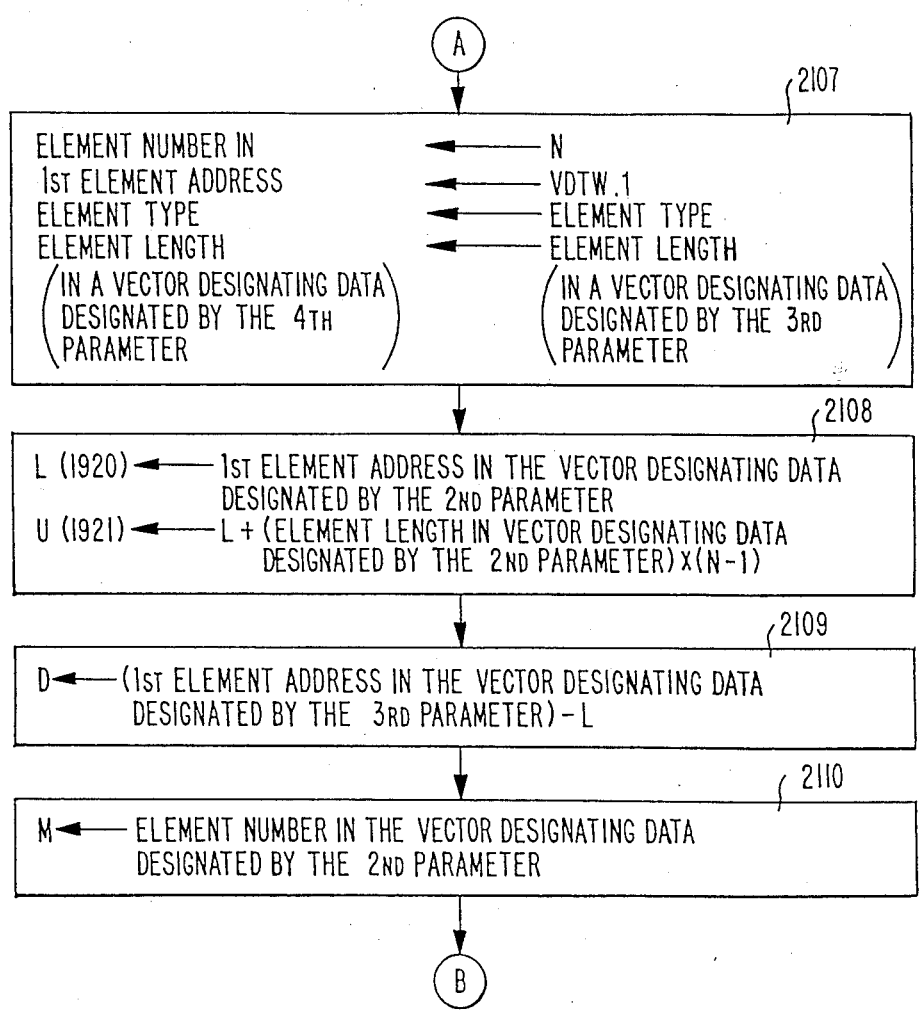

FIGS. 21A and 21B show a flow chart for a program portion in combination for initizlization of the program variables. At first, in VDTD is stored the first element address and the element length of the vector 904, and in the varible N the element number N of the vector 904 is written, all based upon the vector designating data which is designated by the first parameter 614 (step 2102). Next, in order to secure four vector areas in the vector area 111 for four working vectors comprising N elements, the four vector descriptors VDTW (2005), VDTL (2008), VDTC (2011), VDTU (2014) for the four area are determined, as shown by the steps 2103 to 2106. The element length of a vector defined by the descriptor VDTW is the same as the second parameter 615. The vectors described by the descriptors VDTL, VDTC and VDTU are all list vectors and the vector element lengths are all four. The fourth parameter 617 (FIG. 8) designates the vector 1902 which is a result of the JOIN operation. Therefore, it is alright to store N as the element number in the vector designatign data designated by the fourth parameter, and store the start element address of the vector designated by the descriptor VDTW as the start element address in the vector designating data, and the the other data within the vector designating data, such as the vector element type or vector element length, to be the same as those for the vector 1802 designated by the third parameter (step 2107). As already explained, in L (2020) and U (2021) are written the start element address and the last element address of the vector 1801 designated by the second parameter (step 2108). In D is stored the difference between the start element addresses of the vector 1802 and 1801 (step 2109). In M is stored the element number of the vector 1801 (step 2110).

Figure 21C:
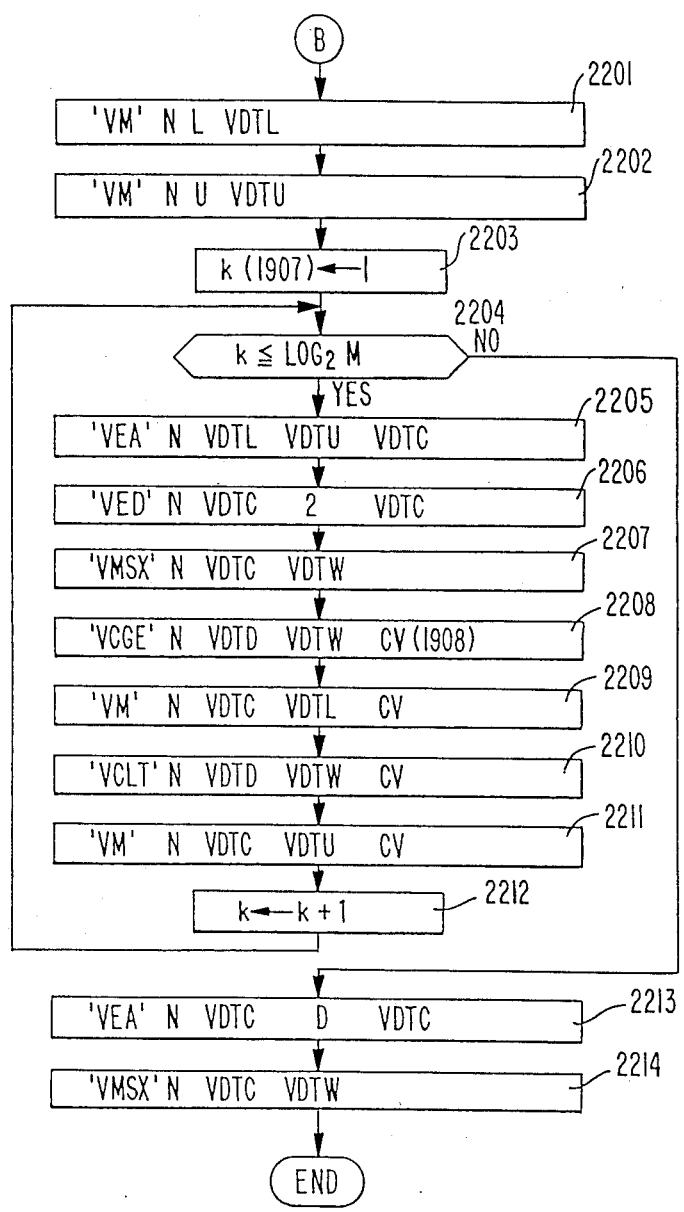

FIG. 21C shows a flow chart for a program portion for a process of searchng an element coinciding with a key and within the vector 1801. The key is sequentially changed so as to be concident with a respective element of the vector 904 described by the descriptor VDID. In FIG. 21C is employed an algorithm which vectorizes a binary search method for plural keys. A binary search for a single key is explained, e.g., in Knuth, D. E.: "The Art of Computer Programming", Vol. 3 "Sorting and Searching". A binary seach method for a single key applies a comparison between the key and the central element selected among plural elements sorted according to the ascending order, and repeats the comparison after restricting the seach area to a half area of the original containing smaller elements, if the key is smaller than the selected central element. In FIG. 21C, the processing is vectorized by treating the search key as a vector and information (such as a lower limit, a center and an upper limit) which designates the search area for each key also as a vector.

Hereinafter, a vectorized binary search will be explained by referring to FIG. 21C. VDTL, VDTC and VDTU identify vectors which respectivly designate lower limits, centers and upper limits. At the beginning, the search area is all elements of the vector 1801, and, therefore the first element address of the vector 1801 is written in all element locations of the vector described by VDTL as an operation of a vector instruction "VM", and the last element address is written in all element locations of the vector designated by VDTU as an operation of the same vector instruction (steps 2201, 2202). Next, the loop count k (1907) is initizilzeed to 1 (step 2203). According to the binary search, the search field becomes half of the previus one by every one operation, and the search will be finished by repeating the loop operation by log 2M times (step 2204), wherein the initial total element number for the search of a vector 1801 is M (2023). While the search is not finished, an addition is performed, in response to a VEA instruction, of a respective element of the vector for the search lower limits described by VDTL and a corresponding element of the vector for the search upper limits described by VDTU, and the results of the addition are stored in corresonding vector element locations of a vector described by VDTC (step 2205).

Next, in response to a VED instruction, a respective element in a vector described by BDTC is divided by two (step 2206). According to this operation of step 2206, we can obtain control element addresses for the search areas for the respective keys as the respective elements of the vector designated by VDJC. Therefore, it is now possible to determine a new narrower search field, depending upon the result of comparison between a respective control element address and a respective key value. In order to perform this operation, the central element addresses are arranged, by means of a VMSX instruction, as elements of a vector designated by VDTW (Step 2207). A comparison between a respective element of the vector described by VDTW and a respective element of a seach key vector described by VDTD is done, by means of a VCGE instruction (step 2208), which is a vector instruction which generates a corresponding element of value 1 or 0 for a control vector CV (1908), depending upon whether or not the element of the vector described by VDTW is larger than or equal to a corresponding element of the vector described by VDTD. Next, a narrower new search area is selected based upon the comparison result shown by the control vector CV, in such a manner that the new search area must be the upper or lower half of the previous one, depending on whether the i-th control vector element is 1 or 0. Therefore, the i-th vector of the lower limit vector of the seach area described by VDTL is replaced, by means of a VM instruction, by the i-th vector element of the central element address vector described by VDTC (step 2209). The VM instruction is a vector instruction which stores an element of the vector designated by VDTC into a corresponding element location within the vector designated by VDTL. Next, we can similarly determine a new narrower search area, by means of a VCLT instruction, in case of keys which are smaller than the corresponding element of the central element addresses vector (steps 2210, 2211). The VCLT instruction is a vector instruction which produces a corresponding element of value 1 for the control vector, when a key is smaller than a corresponding central element address.

After completion of limiting the search area for all keys, the loop count k (1907) is increased (step 2212), and the same process (steps 2205 to 2212) is repeated, until a required repetition of the process is completed (step 2204).

When the search finishes like this, we an obtain each element of the vector designated by VDTC comprising a pointer to an element in the vector 1801 and being the same as a respective key.

In the variable D (2022) there is already stored the difference between the two first element addresses of the vectors 1801 and 1802, and, therefore, by adding D to a respective element of a vector described by VDTC (step 2213) the respective element of the vector described by VDTC represents a pointer to a corresonding element of the vector 1803 (that is, an entry belonging to the same row). Therefore, by applying the VMSX instruction which considers the VDTC, obtained as a result of the step 2213, as a list vector, the vector described by VDTW becomes the result vector 1902, that is, a vector designated by the vector designating data which is designated by the fourth parameter 617 of the JOIN-BY-NESTED-LOOP routine (step 2214).

(7) END-PROCESS routine (706).

When the above-explained routine 706 ends, the CONTROL routine 701 reads the next process designating sentence which includes a key word "END-PROCESS" 618, and three parameters 619 to 621 which designate vector designates data which designates vectors which show results of the search. The END-PROCESS routine 703 erases unnecessary vector within the vector area 111, send necessary vector indicating data to the interface part 104, and ends.

Thus, the execution of a vector type search by the seduction part 109, and the control is now performed by the interface part 104, which reads out the necessary data, in response to the result send request from the application program from the vector area 111 based upon the vector designating data 901, 902 and 1902 provided from the execution part 109, and sends the read out data to the application program. The present invention can be realized even when a vector processor like S-810 developed by the assignee is used instead of the M-280H/Integrated Array Processor (IAP) which is presumed to be used in the disclosed embodiment. Of course, the instruction format changes depending upon the vector processor. For example, in the above-mentioned M-280H/IAP a vector descriptor is used as part of an instruction in order to designate a vector to be processed by the instruction, but in the S-810 type vector processor special purpose registers such as vector length registers amd vector address registers are used. In the present embodiment, the vector designating data is generated when tables are transformed to a vector form of data and the search routine informs a vector instruction by reading out necessary data selected from the vector designating data to write the selected data into a vector descriptor. If we use the special purpose registers instead of the descriptor, we can realize the same operation as in the embodiment even in the S-810 type vector processor. Furthermore, in the embodiment it was presumed that the storage addresses are read addresses with which the main storage can be accessed. In reality, however, logical addresses are often used in this field. In this case, the addresses treated by the program should be considered as logical addresses. An address transforming circuits for transforming a logical address to a corresponding read address is used in order to access the main storage in practice.

What is claimed is:

1. A method for processing a data base, which comprises a plurality of groups of data elements, each group of data elements being stored at storage locations within a data storage device whose addresses are not uniformly separated, the method comprising the steps, performed by a computer, of:
   fetching one group of data elements to be processed among said plurality of groups of data elements, in response to a command requiring processing of the one group of data elements, and storing the one group of data elements into said storage device so that the one group of data elements is stored as elements of vector data at locations with uniformly separated addresses within said stroage device;
   storing vector designating data required for accessing vector data; and
   accessing elements of vector data based upon the vector designating data and processing accessed elements of vector data.

2. A method according to claim 1, wherein the vector designating data includes an address of starting element of a vector.

3. A method according to claim 1, wherein the data base is a relational data base which includes a plurality of table data each comprised of a plurality of columns and rows, wherein a group of data elements belonging to respective rows of a column of a table are stored at storage locations within the data stroage device whose addresses are not uniformly separated.

4. A method according to claim 1, wherein the fetching step includes the steps of:
   determining addresses of respective data elements of one group of data elements and storing determined addresses in the data storage device as elements of vector data at locations with uniformly separated addresses within said data storage device; and
   fetching one group of data elements based upon vector data comprised of said determined addresses and storing the one group of data elements into said data storage device as vector data for the one group of data elements.

5. A method according to claim 4, wherein the address determining and storing step includes the step of:
   accessing group defining data stored within said data storage device and prepared for the one group of data elements so that group specifying data assigned to the one group of data elements and a plurality of data elements specifying data assigned to respective data elements within the one group are read out from the group defining data; and
   determining addresses of respective data elements of the one group based upon the group specifying data and the plurality of data elements specifying data.

6. A method according to claim 5, wherein the data base is a relational data base which includes a plurality of table data each comprised of a plurality of columns and rows, wherein a group of data elements belonging to respective rows of a column of a table are stored at storage locations within the data storage device whose addresses are not uniformly separated.

7. A method according to claim 4, wherein the data base is a relational data base which includes a plurality of table data each comprised of a plurality of columns and rows, wherein a group of data elements belonging to respective rows of a column of table are stored at storage locations within the data storage device whose addresses are not uniformly separated.

8. A method according to claim 1, wherein said fetching and storing step includes the steps of:
   accessing group defining data stored within said data storage device and prepared for the one group of data elements so that group specifying data assigned to the one group of data elements and a plurality of data element specifying data assigned to respective data elements within the one group are read out from the group defining data;
   determining addresses of respective data elements of the one group of data elements based upon the group specifying data and the plurality of data elements specifying data;
   fetching respective data elements of the one group of data elements based upon the determined addresses and storing fetched data elements into said data storage device as vector data.

9. A method according to claim 8, wherein the data base is a relational data base which includes a plurality of table data each comprised of a plurality of columns and rows, wherein a group of data elements belonging to respective rows of a column of a table are stored at storage locations within the data storage device whose addresses are not uniformly separated.

10. A method for processing a data base which comprises a plurality of groups of data elements, each group of data elements being stored at storage locations with nonuniformly spaced addresses within a data storage device, the method comprising the steps, executed by a computer, of:

determining addresses of respective data elements of the one group of data elements and storing the determined addresses into the data storage device as elements of vector data at locations with uniformly separated addresses within said data storage device;

storing vector data designating data required for accessing vector data; and fetching vector data based upon the vector data designating data and processing fetched vector data.

11. A method according to claim 10, wherein the vector designating data includes an address of a starting element of a vector.

12. A method according to claim 10, wherein the data base is a relational data base which includes a plurality of table data each comprised of a plurality of columns and rows, wherein a group of data elements belonging to respective rows of a column of a table are stored at storage locations within the data storage device whose addresses are not uniformly separated.

* * * * *